(12) United States Patent
Lopez et al.

(10) Patent No.: US 9,002,706 B2
(45) Date of Patent: Apr. 7, 2015

(54) CUT AND PASTE SPOOFING DETECTION USING DYNAMIC TIME WARPING

(75) Inventors: Jesus Antonio Villalba Lopez, Zaragora (ES); Alfonso Ortega Gimenez, Zaragora (ES); Eduardo Lleida Solano, Zaragora (ES); Sara Varela Redondo; Marta Garcia Gomar, Madrid (ES)

(73) Assignee: Agnitio SL, Madrid (ES)

( * ) Notice: Subject to any disclaimer, the term of this patent is extended or adjusted under 35 U.S.C. 154(b) by 923 days.

(21) Appl. No.: 13/515,281

(22) PCT Filed: Dec. 10, 2009
(Under 37 CFR 1.47)

(86) PCT No.: PCT/EP2009/008851
§ 371 (c)(1),
(2), (4) Date: Jun. 11, 2012

(87) PCT Pub. No.: WO2010/066435
PCT Pub. Date: Jun. 17, 2010

(65) Prior Publication Data
US 2014/0081638 A1    Mar. 20, 2014

(30) Foreign Application Priority Data

Dec. 10, 2008  (WO) ................ PCT/EP2008/010478
Jun. 26, 2009  (WO) ................ PCT/EP2009/004649

(51) Int. Cl.
*G10L 15/00*     (2013.01)
*G10L 17/00*     (2013.01)
(Continued)

(52) U.S. Cl.
CPC .............. *G10L 17/00* (2013.01); *B66B 13/26* (2013.01); *G10L 17/02* (2013.01); *G10L 17/24* (2013.01)

(58) Field of Classification Search
None
See application file for complete search history.

(56) References Cited

U.S. PATENT DOCUMENTS 3,700,815 A * 10/1972 Doddington et al. ......... 704/246

5,548,647 A * 8/1996 Naik et al. .................... 704/200
(Continued)

FOREIGN PATENT DOCUMENTS

WO      9834216 A2      8/1998

OTHER PUBLICATIONS

Rosenberg, Aaron E. "Automatic speaker verification: A review." Proceedings of the IEEE 64.4 (1976): 475-487.*
(Continued)

*Primary Examiner* — Brian Albertalli
(74) *Attorney, Agent, or Firm* — Galvin Patent Law LLC; Brian R. Galvin

(57) ABSTRACT

The invention refers to a method for comparing voice utterances, the method comprising the steps: extracting a plurality of features (201) from a first voice utterance of a given text sample and extracting a plurality of features (201) from a second voice utterance of said given text sample, wherein each feature is extracted as a function of time, and wherein each feature of the second voice utterance corresponds to a feature of the first voice utterance; applying dynamic time warping (202) to one or more time dependent characteristics of the first and/or second voice utterance e.g. by minimizing one or more distance measures, wherein a distance measure is a measure for the difference of a time dependent characteristic of the first voice utterance and a corresponding time dependent characteristic of the second voice utterance, and wherein a time dependent characteristic of a voice utterance is a time dependent characteristic of either a single feature or a combination of two or more features; calculating a total distance measure (203), wherein the total distance measure is a measure for the difference between the first voice utterance of the given text sample and the second voice utterance of said given text sample, wherein the total distance measure is calculated based on one or more pairs of said time dependent characteristic, and wherein a pair of time dependent characteristic is calculate total composed of a time dependent characteristic of the first or second voice utterance and of a dynamically time warped (202) time dependent characteristic of the respectively second or first voice utterance, or wherein a pair of time dependent characteristic is composed of a dynamically time warped (202) time dependent characteristic of the first voice utterance and of a dynamically time warped (202) time dependent characteristic of the second voice utterance.

13 Claims, 3 Drawing Sheets

Figure 1:
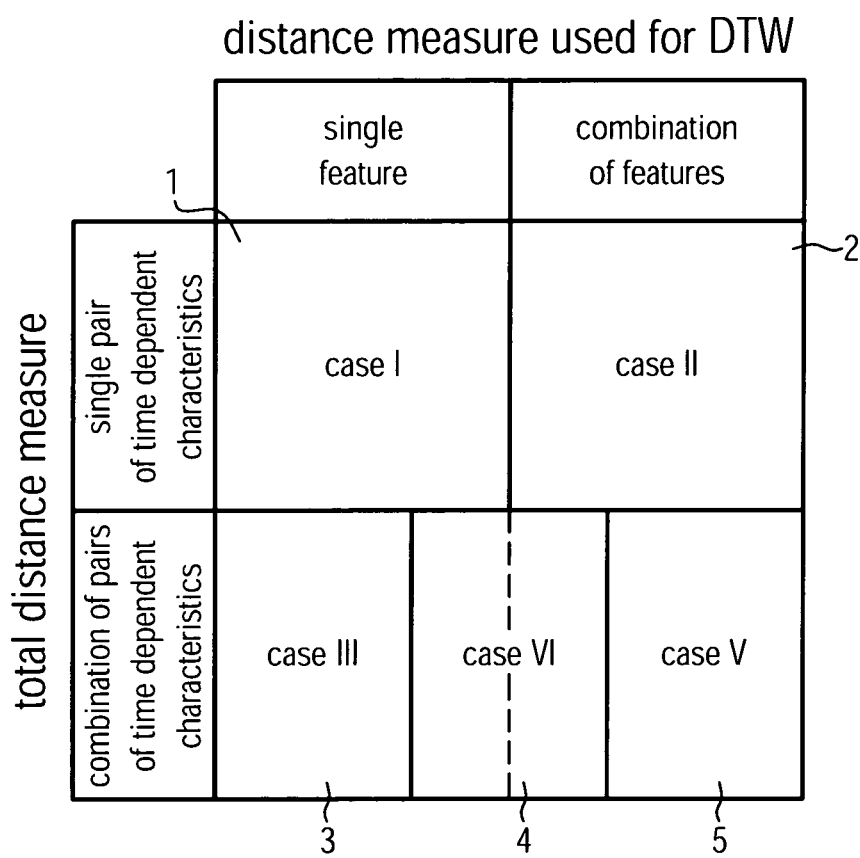

(51) Int. Cl.
  *B66B 13/26*   (2006.01)
  *G10L 17/02*   (2013.01)
  *G10L 17/24*   (2013.01)

(56) References Cited

U.S. PATENT DOCUMENTS

| | | | | |
|---|---|---|---|---|
| 5,809,465 | A * | 9/1998 | Ilan et al. | 704/241 |
| 7,016,833 | B2 * | 3/2006 | Gable et al. | 704/209 |
| 7,050,973 | B2 * | 5/2006 | Aronowitz | 704/246 |
| 7,809,561 | B2 * | 10/2010 | Luan et al. | 704/241 |

OTHER PUBLICATIONS

O'Shaughnessy, D., "Speaker recognition," ASSP Magazine, IEEE, vol. 3, No. 4, pp. 4,17, Oct. 1986.*

Rosenberg, "Evaluation of an Automatic Speaker-Verification System Over Telephone Lines", The Bell System Technical Journal, vol. 55, No. 6, Jul.-Aug. 1976.*

Atal, Bishnu S. "Automatic recognition of speakers from their voices." Proceedings of the IEEE 64.4 (1976): 460-475.*

Furui, Sadaoki. "Comparison of speaker recognition methods using statistical features and dynamic features." Acoustics, Speech and Signal Processing, IEEE Transactions on 29.3 (1981): 342-350.*

Furui, Sadaoki. "Cepstral analysis technique for automatic speaker verification." Acoustics, Speech and Signal Processing, IEEE Transactions on 29.2 (1981): 254-272.*

Rosenberg, Aaron E., and M. Sambur. "New techniques for automatic speaker verification." Acoustics, Speech and Signal Processing, IEEE Transactions on 23.2 (1975): 169-176.*

Pandit, Medha, and Josef Kittler. "Feature selection for a DTW-based speaker verification system." Acoustics, Speech and Signal Processing, 1998. Proceedings of the 1998 IEEE International Conference on. vol. 2. IEEE, 1998.*

Naik, J. J. V. I. "Speaker verification: A tutorial." Communications Magazine, IEEE 28.1 (1990): 42-48.*

Atal, B. S. "Automatic Speaker Recognition Based on Pitch Contours." The Journal of the Acoustical Society of America 52.6B (1972): 1687-1697.*

Joseph P. Campbell Jr. "Speaker Recognition: A Tutorial" Sep. 1, 1997, vol. 85, No. 9, Sep. 1, 1997, XP011043880.

* cited by examiner

CUT AND PASTE SPOOFING DETECTION USING DYNAMIC TIME WARPING

The disclosure of the co-owned PCT applications, with the application Nos. PCT/EP 2008/010478 filed on Dec. 10, 2008, and PCT/EP 2009/004649 filed on Jun. 26, 2009 with the European Patent Office, is fully incorporated herewith by reference. Further, the priorities of these applications according to the Paris Convention are claimed.

The present invention refers to a method, a computer-readable medium and an apparatus for comparing voice utterances.

The comparison of voice utterances can be used to recognize a speaker. For instance, the speaker makes a voice utterance of a given text sample which is then compared with a previously recorded voice utterance from the same speaker. In the event that both voice utterances compare reasonably well, the speaker is successfully identified. Such an identification of a speaker can be used to authenticate a person who wants to get some type of access or who has to prove presence at a certain location, for example.

When performing a comparison of voice utterances, a number of problems can arise. Firstly, even if for two voice utterances that are used in a comparison, the speaker as well as the spoken text sample are the same, there is typically no perfect match between the two voice utterances since the speaker might pronounce some words somewhat differently or the speaker might utter a given text with a different speed, for instance. Secondly, the comparison should be able to detect all kinds of spoofing such as cut and paste spoofing. Cut and paste spoofing can be performed by an unauthorized person when the unauthorized person has access to recorded text from the speaker and produces the text sample by cutting and pasting sequences of these recorded voice utterances from that speaker in order to produce a fake voice utterances of that given text sample which would have the sound of voice of that speaker, in this example.

Therefore, a problem to be solved by the present invention is to improve the comparison of voice utterances in such a way, that on one hand, a speaker can be identified with high efficiency and on the other hand, spoofing, such as cut and paste spoofing, can be reliably detected.

The above-mentioned problem is solved by the method of claim 1, the computer-readable medium of claim 14 and the apparatus of claim 15.

Additional embodiments of the present invention are specified in the dependent claims.

In one embodiment, a method for comparing voice utterances comprises the following steps: Firstly, a plurality of features from a first voice utterance of a given text sample is extracted, and a plurality of features from a second voice utterance of said given text sample is extracted. All features are extracted as a function of time and each feature of the second voice utterance has a corresponding feature of the first voice utterance in order to be able to use the corresponding feature for the above-mentioned comparison.

Secondly, dynamic time warping is applied to one or more time dependent characteristics of the first and/or second voice utterance. This may be done e.g. by minimizing one or more distance measures are by maximizing a similarity measure. Dynamic time warping is for example described in the co owned PCT application with the above mentioned application number PCT/EP 2009/004649. A distance measure is a measure for the difference of a time dependent characteristic of first voice utterance and a corresponding time dependent characteristic of the second voice utterance. A time dependent characteristic of a voice utterance corresponds to either a single feature or a combination of two or more features. Applying dynamic time warping to a time dependent characteristic of the first or second voice utterance can have the effect that said characteristic is elongated or compressed in certain regions along the time axis. Due to this variation or flexibility, respectively, applying dynamic time warping can make a time dependent characteristic of the first or second voice utterance more similar to the time dependent characteristic representing features of the respectively second or first voice utterance. E.G. by jointly treating two of more features in the dynamic time warping process, i.e. applying the same dynamic time warping to the two or more features simultaneously the features can be combined to a characteristic. Here for the dynamic time warping a distance function is used which takes into account two or more features at the same time. The dynamic time warping can thereby performed on a combination of features.

Thirdly, a total distance measure is calculated where the total distance measure is a measure for the difference between a first voice utterance of the given text sample and the second voice utterance of said given text sample. The total distance measure is calculated based on one or more pairs of the above-mentioned time dependent characteristics, where a pair of time dependent characteristics is composed of a time dependent characteristic of the first or second voice utterance and of a dynamically time warped time dependent characteristic of the respectively second or first voice utterance, or where a pair of time dependent characteristic is composed of a dynamically time warped (202) time dependent characteristic of the first voice utterance and of a dynamically time warped (202) time dependent characteristic of the second voice utterance. In other words, time dependent characteristics of a pair are compared with each other and these comparisons, wherein the number of comparisons is the same as the number of pairs, are reflected in the calculation of the total distance measure.

With the above scheme it was found out that in particular cut & paste spoofing can be identified and clearly separated from other (e.g. normal human generated) voice utterances. The abrupt temporal changes of feature values in cut and paste generated voice utterances lead to well recognizable differences in the above mentioned distances but at the same time given a good acceptance rate for voice utterances not generated by cut & paste spoofing.

Using a plurality of features in the comparison of voice utterances is, in particular, useful in situations where a feature does not significantly change with time in a certain time interval but another feature changes significantly with time in said time interval. In the event several features are taken into account for the comparison of voice utterances, it can be better ensured that there is a significant time variation over the whole length of a voice utterance which may be helpful when applying dynamic time warping which works better for a significant variation of single or combined features with time.

Further, taking into account a plurality of features may also be useful when calculating the total distance measure since a total distance measure which is calculated based on several features may allow a comparison of two voice utterances in such a way that in cases where both voice utterances are correctly provided by the same speaker, are better separated from cases where the second voice utterance is a result of cut and paste spoofing. Again, a continuous variation of characteristics as a function of time may be useful to detect either similarities or dissimilarities which could result from cut and paste spoofing (where one might expect abrupt changes in some of the features).

Moreover, taking into account a plurality of features for comparing voice utterances allows performing of the comparison in the form of several sub-comparisons which again may increase the reliability of the comparison since similarities and dissimilarities may be detected in a certain time interval only in the case of some features but not necessarily in the case of any individual feature.

In a further embodiment of the invention, the comparison of voice utterances comprises requesting and receiving the second voice utterance from a speaker and comparing the second voice utterance with a first voice utterance that has been previously recorded. Further, the total distance measure is employed in order to authenticate the speaker of the second voice utterance or, in order to detect that the second voice utterance is a result of spoofing.

The plurality of features may comprise one or more of the following features:
  the pitch or a function of the pitch such as the logPitch wherein logPitch is the logarithm of the pitch,
  the first formant or a function of the first formant such as logF1 wherein logF1 is the logarithm of the first formant,
  the second formant or a function of the second formant such as logF2, wherein logF2 is the logarithm of the second formant,
  the energy or a function of the energy such as logE, wherein logE is the logarithm of the energy,
  C1, wherein C1 is the low frequency energy divided by the high frequency energy or a function of C1,
  and temporal derivatives of any of the above features such as the temporal derivative of logPitch, logF1, logF2, logE and C1.

Derivatives of the above-mentioned features are named in the following with an additional D in front such as, for example, DlogPitch, DlogF1, and DlogF2.

If in a time slice a feature can not be determined then this time slice is removed from the feature.

The distance measures used in context with dynamic time warping and the total distance measure can be defined as an Euclidean distance $$d^2 = \sum_k \int_t (r_k(t) - s_k(t))^2 dt$$

a Mahalanobis distance $$d^2 = \sum_k \int_t \frac{(r_k(t) - s_k(t))^2}{\sigma_k^2} dt$$

and/or a Cosine distance $$d^2 = \sum_k \frac{\vec{r}_k \cdot \vec{s}_k}{\|\vec{r}_k\| \cdot \|\vec{s}_k\|}$$

where r and s are time dependent characteristics with index k of a plurality of characteristics (in case of k being only 1 there being only one characteristic to be taken into account), and where s is a characteristic extracted from the first voice utterance and r is a characteristic extracted from the second voice utterance. The Mahalanobis distance further includes a variation range $\sigma$ for each characteristic. In case of the Cosine distance instead time dependent characteristics vectors of time slices are used to calculate the distance. Here each entry of the vector represents a different time for which the value of the characteristic is given.

Other distance functions may be used instead.

The variation range $\sigma$, used to calculate the Mahalanobis distance, can be computed taking into account characteristics of several voice utterances. The $\sigma$ is a measure for the variability (e.g. standard deviation) of the value around its mean value (as time evolves). For instance, $\sigma$ is computed taking into account a characteristic of the first voice utterance and/or the corresponding characteristic of the second voice utterance, or $\sigma$ is computed taking into account corresponding characteristics of several versions of the first voice utterance and/or corresponding characteristics of several versions of the second voice utterance (e.g. in case the first voice utterance has been recorded several times, or in case the second voice utterance is requested and received several times).

Further, the variation range $\sigma$, used to calculate the Mahalanobis distance, can be computed taking into account a single characteristic of a voice utterance, such as for instance the first voice utterance. Time dependent characteristics can be used to compute the variation range $\sigma$ either before or after dynamic time warping has been applied to said characteristic.

In further methods, the total distance measure is calculated based on a single pair of time dependent characteristics wherein each time dependent characteristic is a characteristic of a single feature. Or, the total distance measure is calculated based on a single pair of time dependent characteristics wherein each time dependent characteristic is a characteristic of a combination of a plurality of features. Or the total distance measure is calculated based on a plurality of pairs of time dependent characteristics wherein each time dependent characteristic is a characteristic of a single feature. Or, the total distance measure is calculated based on a plurality of pairs of time dependent characteristics wherein each time dependent characteristic is either a characteristic of a single feature or a characteristic of a combination of a plurality of features. Or, the total distance measure is calculated based on a plurality of pairs of time dependent characteristics wherein each time dependent characteristic is a characteristic of a combination of a plurality of features.

In the event that features are combined in order to form a time dependent characteristic, 2, 3, 4 or 5 or any number of features can be combined, where the number of features is typically less than 10. Further, the number of pairs used to calculate a total distance measure can be 1, 2, 3, 4, 5 or any number of pairs, which is typically less than 10.

In a further method, a plurality of total distance measures is calculated, and the comparison of the first voice utterance with the second voice utterance is based on the plurality of total distance measures by selecting one or more total distance measures from the plurality of total distance measures and in addition, or alternatively, by combining at least two total distance measures or combinations thereof. For example, an advantage of calculating two or more total distance measures is that the measures can be compared. If the total distance measures agree well with each other the result of each comparison can be trusted more than in the case that the total distance measures give significantly different results.

Figure 2:
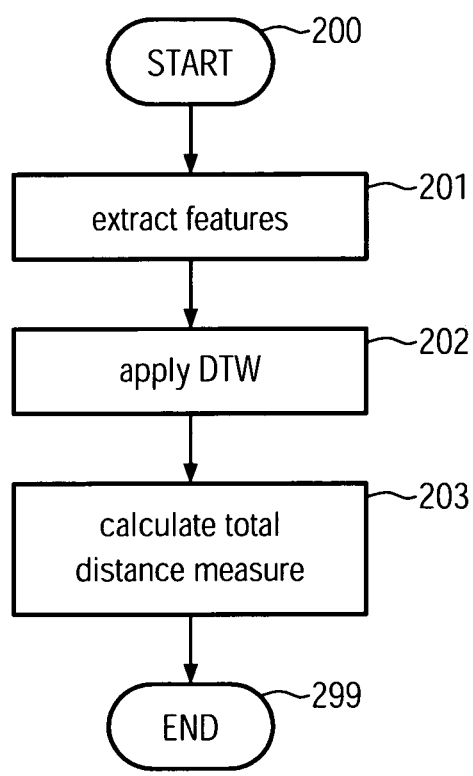
Figure 3:
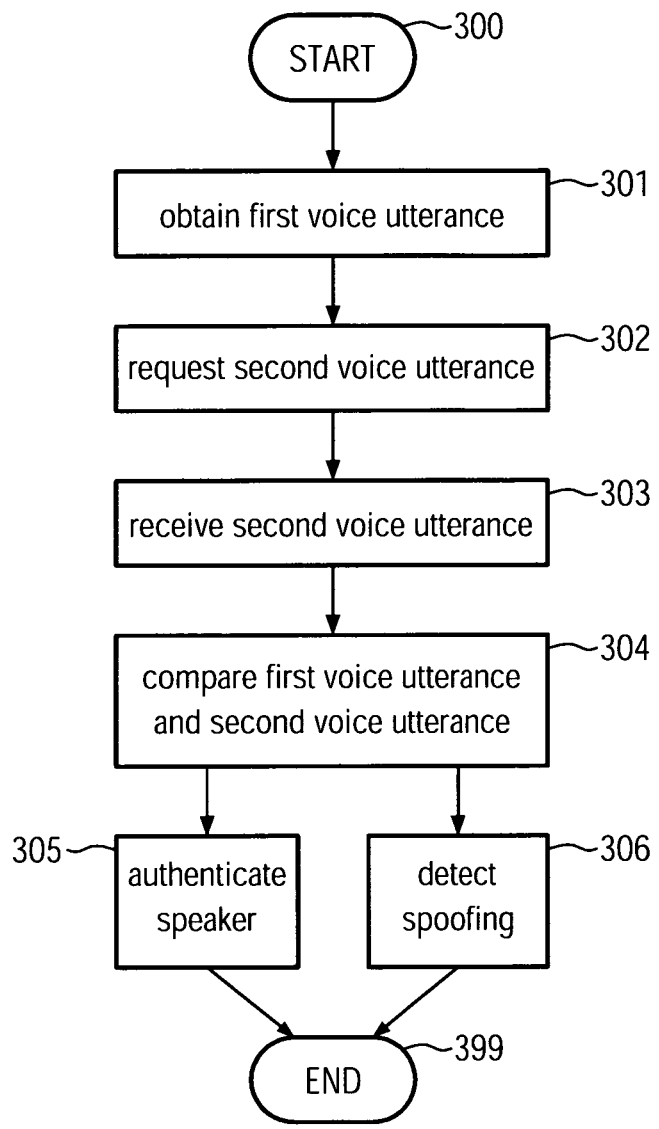

Further aspects of possible embodiments of the invention become clear from FIGS. 1, 2 and 3:

FIG. 1 summarizes different cases which can arise when comparing voice utterances, FIG. 2 is a flow chart of a method for comparing voice utterances, and FIG. 3 is a flow chart of a method for testing the correctness of a (second) voice utterance.

FIG. 1 shows a graphic summarizing different situations when performing a comparison of voice utterances. Distance measures which are used for dynamic time warping (DTW) may be performed for time dependent characteristics, where a time dependent characteristics is a characteristic of either a single feature (left column) or of a combination of at least two features (right column). The total distance measure is calculated based on pairs of the above-mentioned time dependent characteristics. The calculation of a total distance measure is either based on a single pair of time dependent characteristics (upper line) or is based on a plurality of pairs of time dependent characteristics (lower line).

The above-mentioned columns and lines intersect in five intersection fields 1, 2, 3, 4, 5 which represent five different cases (roman numbers).

Case I is the situation where the total distance measure is calculated based on a single pair of time dependent characteristics wherein each time dependent characteristic (used for DTW) is a characteristic of a single feature. For instance, the total distance measure is based on a pair of C1 characteristics, where one C1 characteristic is extracted from the first voice utterance and the other C1 characteristic is extracted from the second voice utterance.

In case II, the total distance measure is calculated based on a single pair of time dependent characteristics wherein each time dependent characteristic is a characteristic of a combination of a plurality of features. For example, the total distance measure is calculated based on a single pair of time dependent characteristics, where each time dependent characteristic of that pair is a combination of logF1 and logF2.

In case III, the total distance measure is calculated based on a plurality of pairs of time dependent characteristics where each time dependent characteristic is a characteristic of a single feature. For example, the total distance measure is calculated based on three pairs of time dependent characteristics where the time dependent characteristics of the first pair are characteristics of logPitch, where the time dependent characteristics of the second pair are characteristics of logF1, and where the time dependent characteristics of the third pair are characteristics of logF2.

Case of IV is the situation, where the total distance measure is calculated based on a plurality of pairs of time dependent characteristics where each time dependent characteristic is either a characteristic of a single feature or a characteristic of a combination of plurality of features. In other words, case IV is a mixture of the left column with the right column of FIG. 1. For example, the total distance measure is calculated based on three pairs of time dependent characteristics, where the time dependent characteristics of the first pair is a characteristic of logPitch, where the time dependent characteristics of the second pair are characteristics of combinations of logF1 and logF2, and where the characteristics for the third pair are characteristics for C1. This particular example turned out to be the most effective one for clearly distinguishing between cut and paste generated voice utterances and normally generated voice utterances, allowing even an EER (equal error rate) of zero in a particular test, which means that all of 120 voice utterances could be correctly identified as cut & past or as normal. As can be seen from this example the calculation of a total distance measure based on a characteristic which is a single feature and a characteristic which is a combination of features turns out to be particularly advantageous.

In case V, the total distance measure is calculated based on a plurality of pairs of time dependent characteristics, where each time dependent characteristic is a characteristic of a combination of a plurality of features. For example, the total distance measure is calculated based on two pairs of time dependent characteristics, where the time dependent characteristics of the first pair are a characteristic of combinations of logPitch and DlogPitch, and where the time dependent characteristics of the second pair are characteristics of combinations of logF1, logF2, DlogF1 and DlogF2.

From the above-mentioned cases and examples, it becomes clear that there are many ways available to calculate the total distance measure. The best way of calculating the total distance measure may depend on the type of application where the comparison of voice utterances is employed. For a specific application, it is possible to determine a configuration that works best by performing tests based on test samples. For instance, a first test sample contains first voice utterances, a second test sample contains corresponding second voice utterances, and a third test sample contains corresponding second voice utterances that have been produced by attaching voice utterance sequences to each other (in order to simulate cut and paste spoofing). Then, a first voice utterance of the first test sample can be compared with a corresponding second voice utterance of the second test sample, and the same first voice utterance of the first test sample can be compared with the corresponding second voice utterance of the third test sample. These comparisons with second voice utterances from the second test sample and the third test sample can be repeated several times in order to allow a statistical analysis of the comparison results. In this way, it can be tested how well a particular total distance measure can separate comparisons with second voice utterances from the second test sample from second voice utterances from the third test sample. The separation power can be quantified, for instance, by calculating the equal error rate (EER) or by calculating the minimum log likelihood ratio based cost function (minCllr).

FIG. 2 shows a flow chart representing the method for comparing voice utterances. The method starts at step 200. In step 201, a plurality of features is extracted from the first voice utterance and the corresponding plurality of features is extracted from a second voice utterance. Then, in step 202, dynamic time warping (DTW) is applied to one or more time dependent characteristics of the second voice utterance such, that e.g. corresponding distance measures are minimized. A distance measure is a measure for the difference of a time dependent characteristic representing features of the first voice utterances and a corresponding time dependent characteristic representing features of the second voice utterance, where a time dependent characteristic of a voice utterance is a time dependent characteristic of either a single feature or a combination of several features.

To give an example, the two features F1 and F2 are to be considered. $F1_1$ is the first feature of the first voice utterance and $F1_2$ is the first feature of the second voice utterance. $F2_1$ is the second feature of the first voice utterance and $F2_2$ is the second feature of the second voice utterance. All those features are time dependent. The features $F1_2$ and $F2_2$ are to be dynamically time warped to fit better to $F1_1$ and $F2_1$ respectively. In case feature $F1_2$ is dynamically time warped to feature $F1_1$ independently of feature $F2_1$ or $F2_2$ (and independently of any other feature) then each feature is considered to be a characteristic on its own. The two features F1 and F2 may in another method be time warped jointly. This means that the deformation in the time axis (stretching or compressing the feature in portions of the time axis) have to be carried out equally for both features F1 and F2. The calculation of the distance between $F1_1$ and $F1_2$ on the one hand and $F2_1$ and $F2_2$ on the other hand used for the dynamic time warping takes into account both pairs. With the above mentioned distance formulas the distances of both features are calculated and e.g. summed up. This is an example of a combination of two features thereby forming a characteristic. In the same way three or more features can be combined to a characteristic.

The dynamic time warping may be carried out multiple times taken into account different combination of features (characteristics) or individual features, being characteristics. Each calculation of the dynamic time warping may give a different time warping. E.g. for feature F1 a different time warping may be obtained then for feature F2 or for the combination of feature F1 with F2. One ore more features may further be used individually as a characteristic on its own and also be used in combination with another feature to form a characteristic. E.g. Feature F1 may be used as a characteristic and F1 and F2 may be combined to form a characteristic.

In step 203, a total distance measure is evaluated or calculated. The total distance measure is a measure for the difference between the first voice utterance of the given text sample and the second voice utterance of said given text sample where the total distance measure is calculated based on one or more pairs of said time dependent characteristics. A pair of time dependent characteristics is composed of a time dependent characteristic of the first voice utterance and of a dynamically time warped (step 202), time dependent characteristic of the second voice utterance. (The pair of time dependent characteristics can also be composed of a dynamically time warped time dependent characteristic of the first voice utterance and of a time dependent characteristic of the second voice utterance, or the pair of time dependent characteristics can also be composed of a dynamically time warped time dependent characteristic of the first voice utterance and of a dynamically time warped time dependent characteristic of the second voice utterance) Then, the method terminates at step 299. Instead of taking the feature/characteristic of the second voice utterance in the dynamic time warped version also the one(s) of the first voice utterance can betaken into account.

Further the results of the calculations of distances performed during the dynamic time warping may be used for the determination of the total distance if possible.

The dynamic time warping may include linear relations between the original time axis and the warped time axis. The relation may be partially linear or may be any monotonously increasing function.

FIG. 3 shows a flow chart representing a method for either authenticating a speaker or detecting spoofing when comparing voice utterances. The method begins at step 300. In step 301, a first voice utterance is obtained. A first voice utterance may have been recorded previously (e.g. in an enrolment session or upon a previous request to utter the voice utterance) and may be obtained from e.g. a data store or memory. In step 302, a second voice utterance is requested from a speaker, and in step 303, the second voice utterance is received from said speaker. Then, in step 304, the first voice utterance is compared with the second voice utterance. Based on the comparison of step 304, the speaker is authenticated in step 305, if the first voice utterance compares well with the second voice utterance. Otherwise, if the first voice utterance does not compare well with the second voice utterance, it is concluded that the second voice utterance is a result of spoofing, such as cut and paste spoofing, in step 306. After step 305 or 306, the method terminates at step 399.

The above-mentioned method is only one example of how the comparison of voice utterances can be employed for an application. There are many other possibilities of applications possible such as employing the comparison of voice utterances in order to detect that the speaker of the second voice utterance does not correspond to the speaker of the first voice utterance, for instance.

The method described may be part of the passive test for falsification as described in the above mentioned application PCT/EP2008/010478 or PCT/EP2009/004649.

The invention claimed is:

1. A method for comparing voice utterances, the method comprising the steps of:
   receiving, at a computer, a plurality of voice utterances of a given text sample;
   extracting a plurality of features from a first voice utterance of the given text sample and extracting a plurality of features from a second voice utterance of said given text sample, wherein each feature is extracted as a function of time, and wherein each feature of the second voice utterance corresponds to a feature of the first voice utterance;
   applying dynamic time warping to one or more time dependent characteristics of the first and/or second voice utterance by minimizing one or more distance measures, wherein a distance measure is a measure of a difference between a time dependent characteristic of the first voice utterance and a corresponding time dependent characteristic of the second voice utterance, and wherein a time dependent characteristic of a voice utterance is a time dependent characteristic of either a single feature or a combination of two or more features; and
   calculating a total distance measure, wherein the total distance measure is a measure for a difference between the first voice utterance of the given text sample and the second voice utterance of the given text sample, wherein the total distance measure is calculated based at least based on one or more pairs of time dependent characteristics, and wherein a pair of time dependent characteristics is composed of a time dependent characteristic of the first or second voice utterance and of a dynamically time warped time dependent characteristic of the respectively second or first voice utterance, or wherein a pair of time dependent characteristics is composed of a dynamically time warped time dependent characteristic of the first voice utterance and of a dynamically time warped time dependent characteristic of the second voice utterance;
   wherein the total distance measure is used to detect that the second voice utterance is a result of cut and paste spoofing;
   wherein the detection of cut and paste spoofing of a second voice utterance is accomplished by measuring abrupt temporal changes of feature values.

2. The method according to claim 1, wherein the first voice utterance has been recorded previously, and wherein the second voice utterance is received from a speaker upon request.

3. The method according to claim 2, wherein the total distance measure is used to authenticate the speaker of the second voice utterance.

4. The method according to claim 1, wherein in the plurality of features comprises one or more of the following features:
   the logPitch of a pitch or a function thereof, wherein logPitch is the logarithm of the pitch;
   the logF1 of a first formant or a function thereof, wherein logF1 is the logarithm of the first formant;
   the logF2 of a second formant or a function thereof, wherein logF2 is the logarithm of the second formant;
   the logE of energy of or a function thereof, wherein logE is the logarithm of the energy;

C1 or a function thereof, wherein C1 is the low frequency energy divided by the high frequency energy;

and temporal derivatives of any of the above features such as the temporal derivative of logPitch, logF1, logF2, logE and C1.

5. The method according to claim 4, wherein a distance measure of dynamic time warping is defined as one of a Euclidean distance, a Mahalanobis distance, and a Cosine distance.

6. The method according to claim 5, wherein the total distance measure is defined as a Euclidean distance, a Mahalanobis distance or a Cosine distance.

7. The method according to claim 6, wherein the distance measure is calculated based at least on a single pair of time dependent characteristics, wherein each time dependent characteristic is a characteristic of a single feature.

8. The method according to claim 6, wherein the distance measure is calculated based on a single pair of time dependent characteristics, wherein each time dependent characteristic is a characteristic of a combination of a plurality of features.

9. The method of claim 6, wherein the total distance measure is calculated based at least on a plurality of pairs of time dependent characteristics, wherein each time dependent characteristic is a characteristic of a single feature.

10. The method of claim 6, wherein the total distance measure is calculated based on a plurality of pairs of time dependent characteristics, wherein at least one time dependent characteristic is a characteristic of a single feature and at least one characteristic of a combination of a plurality of features.

11. The method of claim 6, wherein the total distance measure is calculated based on a plurality of pairs of time dependent characteristics, wherein each time dependent characteristic is a characteristic of a combination of a plurality of features.

12. The method of claim 11, wherein a plurality of total distance measures is calculated (203), and wherein the comparison of the first voice utterance with the second voice utterance is based on the plurality of total distance measures by selecting one or more total distance measures from the plurality of total distance measures and/or by combining at least two total distance measures.

13. A computer-readable medium comprising computer-executable instructions for performing the method of claim 1.

* * * * *